Dec. 24, 1968     M. J. WILLARD     3,417,483
FOOD DEHYDRATION APPARATUS
Filed Sept. 28, 1965
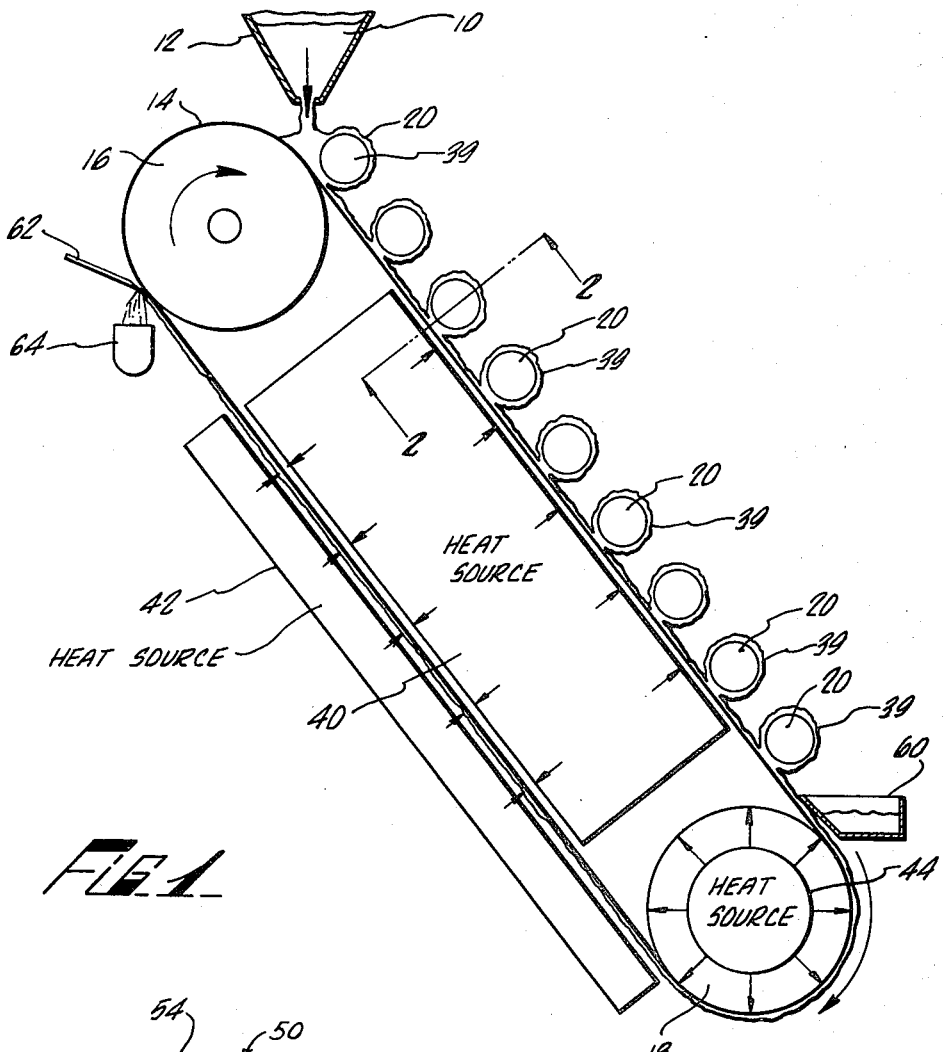
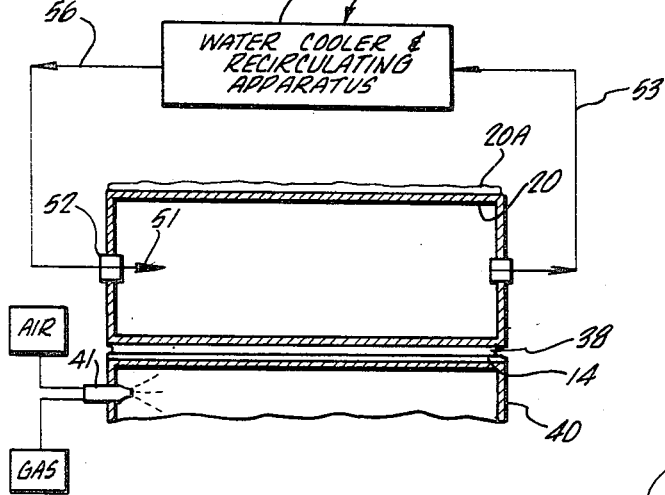
INVENTOR.
MILES J. WILLARD
BY
*Christie, Parker & Hale*
ATTORNEYS.

United States Patent Office 3,417,483
Patented Dec. 24, 1968

3,417,483
FOOD DEHYDRATION APPARATUS
Miles J. Willard, 3067 Gustafson Circle,
Idaho Falls, Idaho 83401
Filed Sept. 28, 1965, Ser. No. 490,940
5 Claims. (Cl. 34—117)

ABSTRACT OF THE DISCLOSURE

Mashed potatoes are dehydrated by passing them between an endless belt and a plurality of spreader rolls disposed along the belt.

---

This invention relates to a food product in the form of dehydrated flakes and to the process and apparatus for dehydrating potatoes and other vegetables and fruits into flakes. Although the invention is useful in dehydrating a variety of foodstuffs, it is particularly an improvement in the dehydration of mashed potatoes and is, therefore, described with reference to that use.

A process has been developed for dehydrating mashed potatoes into flakes which can be stored for an indefinite period and thereafter reconstituted by the addition of moisture. This prior art process, well known on the cooking art, includes the steps of passing precooked, mashed potatoes between a rotating drier drum and a series of rotating spreader rolls. A thick layer of mashed potatoes accumulates on each spreader roll and a thinner layer is applied to the drier drum where it is dehydrated and thereafter removed as a sheet and crumbled into flakes.

There are a number of disadvantages to the prior art process which center around the type of flake which is produced by this process. To date, flakes produced by the known process have a maximum thickness of about 0.010 inch. These flakes occupy a great deal of volume when packaged because they are thin and tend to be fluffy. More important, potato flakes having a thickness of 0.010 inch cannot be reconstituted by boiling liquids since the reconstituted product would have a pasty texture caused in part by free starch liberation by bursting potato cells that expand too rapidly in the boiling liquid. For this reason, liquids heated to a temperature no higher than between about 170° F. and about 180° F. must be used for reconstituting flakes.

The thickness of the potato flake made by the prior art process is limited by the number of spreader rolls which individually apply a single layer of potato cells upon the drying drum. It has been found that the spreader rolls can extend over only one-quarter of the drying drum which limits the number of rolls to approximately five rolls and inherently limits the thickness of the dehydrated flakes.

Another problem encountered in making potato flakes by the prior art process is the tendency for the potato mass to drop from one roll to the next. It is usually necessary for an operator for each drier to shovel the mash back upon the previous rolls. This type of an operation increases the cost of production and the end product.

In accordance with the present invention, a flaked dehydrated food product is produced which packages to a greater density than heretofore obtainable, thereby reducing packaging costs. It also rehydrates more slowly than the prior art product and permits boiling liquids to be used for reconstituting the product without much potato cell breakage. The invention also provides dehydrated potato flakes with greater thickness than heretofore obtainable which lends the product to other uses such as snack foods.

This invention is also directed to a process for making potato flakes formed from an almost unlimited number of layers of potato cells. The process is carried out on an endless belt passing around a pair of spaced rotatable drums with a plurality of spreader rolls disposed along the belt. Since a belt is used, the number of spreader rolls is unlimited, and thereby eliminates the disadvantages of the prior art process and apparatus in which only a limited number of spreader rolls can be located adjacent the drier drum.

A food product in accordance with the present invention is a food flake formed from a plurality of food cell layers in the dehydrated state. The flakes have a thickness of at least 0.15 inch which enables the flake to be reconstituted in hot water with substantially less cell rupture than occurred with the inner flakes produced prior to this invention.

In terms of a process, the present invention includes the steps of passing cooked, mashed potatoes between a moving drying surface and a series of spreader rolls until enough layers of potato cells are applied to the drying surface so the total thickness of potato layer is at least .015 inch in the dehydrated state. As the potato layers are applied to the drying surface, they are heated to drive water out.

Apparatus for dehydrating moist foods in accordance with the present invention includes an endless belt being disposed to move over a pair of rotatable spaced drums. A plurality of spreader rolls are disposed along the belt and a means for passing moist food between the belt and the rolls is used to deposit a layer of the food on the belt. The apparatus also includes means for applying heat to the food on the belt to drive moisture out of the food.

The invention will be more fully understood from the following detailed description and the accompanying drawings, in which:

FIG. 1 is a schematic front elevation of potato mash being applied between a movable endless belt and several spreader rolls; and FIG. 2 is a schematic cross section taken on line 2—2 showing the interior of a spreader roll.

Raw potatoes (not shown) to be dehydrated are peeled by either an abrasion process, a steam peeling process, or a treatment with lye at 200° F. for four minutes. The potatoes are washed, hand trimmed to remove blemishes and other irregularities and thereafter sliced into slabs approximately one-half inch thick. Excess starch is washed from the sliced potatoes before precooking them for twenty minutes in water at about 160° F. The precooking steps gels the starch in the potato cells at a low temperature before the final cooking step to improve the texture of the reconstituted product and to permit the use of low solids potatoes. The precooked potatoes are cooled to a temperature of 50° to 60° F. to retrograde, polymerize, or cross-link amylose and reduce the stickiness of the potatoes. The cooled, precooked potatoes are thereafter cooked at 200° to 212° F. for a period which varies with the amount of solids in the potatoes. Approximately twenty minutes is required for high solid potato varieties, whereas forty minutes is sometimes required for low solid potatoes. At any rate, the potatoes are cooked to the point where they are soft enough to be mashed easily with minimum cell rupture. The cooked potatoes can be mashed by inserting the potatoes in a ricing machine to prevent the bursting of potato cells and minimize liberation of free starch.

At this point, additives such as emulsifiers, diglycerates, sodium acid phosphate, polyphosphate, sulfur dioxide, antioxidants and the like are added to the potato mash as required.

Referring to FIGS. 1 and 2, cooked potato mash 10 is dropped from a hopper 12 upon a moving flexible stainless steel endless belt 14 that is spaced below the hopper and moves around a pair of spaced cylindrical rotatable drums 16 and 18. Drum 18 is spaced below and slightly to one side of the drum 16 so the endless belt 14 is at about a 70° angle to horizontal. The potato mash passes between the endless belt 14 and a plurality of elongated cylindrical spreader rolls 20 that are disposed close to the outside surface of the upper portion of the belt with their respective axes parallel to the axes of both drums 16 and 18. A conventional driving means (not shown) are connected to the spreader rolls 20 and the drums 16 and 18.

A relatively thin layer 38 of potato mash is deposited on the endless belt 14 and a relatively thicker layer 39 is picked up by each of the spreader rolls 20. The mashed potato layer on the uppermost spreader roll is periodically scraped off by a conventional rotatable knife (not shown) and permitted to fall by gravity against the adjacent rotatable spreader roll where it accumulates around the roll. Alternatively, the potato mash drops of its own accord from the upper to the lower rolls. The position of endless belt and the spreader rolls is such that the potato mash will naturally fall from an upper to a lower roll. Each of the spreader rolls applies a monocellular layer of potatoes upon the endless belt 14 and generally the total number of potato cell layers on the endless belt is equal to the total number of spreader rolls. By extending the distance between the two drums 16, 18, extending the endless belt 14, and adding additional spreader rolls 20, a layer of dehydrated potatoes of almost limitless thickness can be produced by using the present invention.

A first heat source 40 is disposed between the rotatable drums 16 and 18 and serves to drive out water from the potato layer on the endless belt. The heat from the source can be generated from any type of conventional device as, for example, steam, electric resistance wires, direct-fired gas burners, radiant heat, and the like could be used either alone or in combination.

FIG. 2 shows a gas burner nozzle 41 mounted in the side of the first heat source 40. Air and gas are supplied to the nozzle to burn within the heat source. This form of direct gas-fired heating is preferred because it is most economical.

A second heat source 42 is directed toward the endless belt 14 on the side opposite the plurality of spreader rolls 20 and also opposite the first heat source 40. Thus, the potato layer 38 on the endless belt is heated from both sides of the endless belt which tends to uniformly dry the potato layer. A third heat source 44 is disposed within the drum 18 and serves to drive the water from the potato layer 38 as it passes around the drum such that the potato mash layer is constantly heated as it progresses around the endless belt. The drum 18 is preferably heated by steam.

Referring to FIG. 2, each separator roll 20 has a means for cooling the relatively thick potato mash layer 39 on the roll. The cooling means is a water dispensing device 50 disposed within the roll and is, for example, an inlet nozzle 51 journaled through a swivel 52 in one end of the drum. The water discharged within the roll 20 is recirculated out of the roll 20 through an outlet pipe 53 through a water cooler and recirculating apparatus 54. The temperature of the water is regulated by a conventional thermostat (not shown) and the water is redirected into the spreader roll 20 through an inlet pipe 56 connected to the nozzle. The spreader roll 20 is constantly cooled to a temperature of approximately 180° F. to prevent the potato layer on it from being overheated. Water vapor and steam issues from the potato mash layer, and to prevent water from condensing back onto the potatoes, a warm air blast (not shown) is directed between adjacent separator rolls.

An open trough 60 is spaced below the lowest spreader roll and adjacent the endless belt so that any matter which falls or is cut from the bottom spreader roll, such as any peelings, corky tissue, or foreign matter, may fall directly into the trough. The rolls tend to collect and concentrate such undesirable matter, and the large number of spreader rolls used in accordance with this invention improve the automatic removal of the matter from the final product.

After the potato layer 38 has been dehydrated by the heat sources, it is cut from the endless belt by a conventional doctor knife 62 bearing against the endless belt as it contacts the rotatable drum 16, causing the potato layer 38 to fall as a sheet into a product conveyor 64. The dehydrated potatoes are broken into flakes and packaged in a moisture-tight container.

Although the foregoing description is directed specifically to dehydrating mashed potatoes, it will be apparent that other fruits and vegetables can be dried in a similar manner.

An important advantage of this invention is that the relatively large number of spreader rolls deposits a fairly thick sheet of dried potatoes or other food product on the endless belt. The thicker flake permits packaging at a higher density so that more pounds can be placed in a package of a given size, thereby reducing the over-all cost of the product.

Another advantage of the thicker potato flakes produced by this invention is that they can be rehydrated in boiling water instead of being limited to rehydration of water of about 170° F. to 180° F. The increased thickness of the product of this invention results in a longer hydration time, even though hotter water is used, thereby reducing the rate of diffusion of water in most of the potato cells with a corresponding lesser degree of cell breakage. This improves texture of the final rehydrated product without the user having to take special care to avoid rehydration at temperatures below the boiling point of water.

An additional application of the invention is that by substantially increasing the thickness of the deposited potato mash, snack products of unique character are produced. For example, a potato chip-like product is made without frying, and can be easily flavored with various condiments. Additional binding agents such as starches, proteins, milk powder, and the like are incorporated in the mashed potatoes to give different properties and provide additional bonding between adjacent layers of mashed potato cells. Extended drying of the thicker flake imparts a tasteful toasted flavor to the final product. Combinations of vegetables, fruits, and cereal grains and starches are also added to the thicker flake to produce new and novel foods and snack items. Dehydration can be speeded and flavor further preserved by removing water under vacuum or pressure substantially below atmospheric.

I claim:

1. Apparatus for dehydrating a food product comprising a pair of rotatable spaced drums, an endless belt being disposed to move over the drums at an angle to the horizontal, a plurality of spreader rolls disposed along the outer surface of the belt, the spreader rolls being at different elevations relative to each other and arranged so that a food product on the rolls falls by gravity from one roll to an adjacent lower roll, and means for applying heat to the food on the belt to drive off moisture.

2. Apparatus for dehydrating a food product comprising a pair of rotatable spaced drums, one drum being almost directly above the other, an endless flexible belt having inner and outer surfaces and disposed to move over the drums, a plurality of spaced spreader rolls being disposed along the outer surface of the belt for about one-half of the belt length and being so arranged that a food product on the rolls walls by gravity from one roll to an adjacent lower roll, and means for applying heat to the food on the belt to drive moisture from the food.

3. Apparatus for dehydrating a food product comprising a pair of rotatable spaced drums, the drums being located almost vertical relative to each other, an endless flexible belt having inner and outer surfaces and disposed to move over the drum, a plurality of spaced spreader rolls being disposed along the outer surface of the belt on a first half of the belt and being so arranged that a food product on the rolls falls by gravity from one roll to an adjacent lower roll, and a heat source arranged on both the inner and outer surfaces of the second half of the belt to drive water from the food product.

4. Apparatus for dehydrating a food product comprising a pair of rotatable spaced drums, the drums being located almost vertical relative to each other, an endless flexible belt having inner and outer surfaces and disposed to move over the drum, a plurality of spaced spreader rolls being disposed along the outer surface of the belt on a first half of the belt and being so arranged that a food product on the rolls walls by gravity from one roll to an adjacent lower roll, and a direct-fired gas heat source arranged on the inside of the belt to drive water from the food product.

5. Apparatus for dehydrating a food product comprising a pair of rotatable spaced drums, the drums being located almost vertical relative to each other, an endless flexible belt having inner and outer surfaces and disposed to move over the drums, a plurality of spaced spreader rolls being disposed along the outer surface of the belt on approximately a first half of the belt length and being so arranged that a food product on the rolls may fall by gravity from one roll to an adjacent lower roll, a first heat source disposed adjacent the second half of the belt to drive water from the food product, and a second heat source disposed within at least one of the rotatable drums.

References Cited

UNITED STATES PATENTS

| 3,163,546 | 12/1964 | Pader | 99—207 |
| 3,275,458 | 9/1966 | Willard | 99—207 |

OTHER REFERENCES

Von Loesecke, H. W., Drying and Dehydration of Foods. Reinhold Publishing Corporation, New York, 1955, second ed. (pp. 5–7).

Cording et al., Advances in the Dehydration of Mashed Potatoes by the Flake Process. 1957 Food Technology, vol. XI, No. 4 (pp. 1–3).

A. LOUIS MONACELL, *Primary Examiner.*

D. M. NAFF, *Assistant Examiner.*

U.S. Cl. X.R.

34—62; 159—7; 99—207, 246; 34—216

UNITED STATES PATENT OFFICE
CERTIFICATE OF CORRECTION

Patent No. 3,417,483

December 24, 1968

Miles J. Willard

It is certified that error appears in the above identified patent and that said Letters Patent are hereby corrected as shown below:

Column 2, line 15, "inner" should read -- thinner --; line 50, "gels" should read -- gel --. Column 4, line 28, "of", second occurrence, should read -- with --; line 73, "walls" should read -- falls --. Column 5, line 18, "walls" should read -- falls --.

Signed and sealed this 17th day of March 1970.

(SEAL)
Attest:

Edward M. Fletcher, Jr.
Attesting Officer

WILLIAM E. SCHUYLER, JR.
Commissioner of Patents